United States Patent
Lee et al.

(10) Patent No.: US 11,047,319 B2
(45) Date of Patent: Jun. 29, 2021

(54) METHOD AND SYSTEM FOR CALCULATING FUEL INJECTION AMOUNT OF FUEL VAPOR DUAL PURGE SYSTEM

(71) Applicants: Hyundai Motor Company, Seoul (KR); KIA Motors Corporation, Seoul (KR)

(72) Inventors: Hyeon A Lee, Busan (KR); Kyungwook Choi, Ansan-si (KR); Kyu Sup Kim, Seoul (KR); Tae Kwang Eom, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 141 days.

(21) Appl. No.: 16/210,287

(22) Filed: Dec. 5, 2018

(65) Prior Publication Data
US 2020/0109674 A1    Apr. 9, 2020

(30) Foreign Application Priority Data
Oct. 5, 2018    (KR) .................. 10-2018-0118783

(51) Int. Cl.
   *F02D 41/00*    (2006.01)
   *F02B 37/16*    (2006.01)
   *F02M 25/08*    (2006.01)

(52) U.S. Cl.
   CPC ....... *F02D 41/0007* (2013.01); *F02D 41/004* (2013.01); *F02B 37/164* (2013.01); *F02M 25/0827* (2013.01); *F02M 25/0836* (2013.01); *F02M 25/0854* (2013.01)

(58) Field of Classification Search
   CPC ............... F02D 41/0007; F02D 41/004; F02D 2041/1431; F02D 41/0042; F02D 2200/0411; F02D 41/0045; F02B 37/164; F02M 25/0827; F02M 25/0854; F02M 25/0836; Y02T 10/12
   USPC ......................................................... 701/102
   See application file for complete search history.

(56) References Cited

U.S. PATENT DOCUMENTS

| 5,553,595 A | 9/1996 | Nishioka et al. |
| 6,675,788 B2 | 1/2004 | Inoue et al. |
| 9,528,473 B2 | 12/2016 | Dudar et al. |
| 2003/0005915 A1 * | 1/2003 | Mitsutani ............ F02D 41/0042 123/674 |

(Continued)

FOREIGN PATENT DOCUMENTS

JP    2009275676 A    11/2009

*Primary Examiner* — Joseph J Dallo
*Assistant Examiner* — Scott A Reinbold
(74) *Attorney, Agent, or Firm* — Brinks Gilson & Lione (57) ABSTRACT

The method for calculating the fuel injection amount of a fuel vapor dual purge system may include the steps of calculating, by a controller, volumetric efficiency of a combustion chamber, determining, by the controller, a fuel vapor detection delay time at which the fuel vapor is detected in a surge tank according to the calculated volumetric efficiency of a combustion chamber, calculating, by the controller, a time at which the fuel vapor is injected into the combustion chamber based on the determined fuel vapor detection delay time, and calculating, by the controller, a fuel vapor total injection amount at the time at which the fuel vapor is injected into the combustion chamber. The method may be performed in a turbocharger operation section.

4 Claims, 8 Drawing Sheets

(56) References Cited

U.S. PATENT DOCUMENTS

| | | | |
|---|---|---|---|
| 2009/0283075 A1* | 11/2009 | Yamazaki | F02D 41/222 123/521 |
| 2010/0218749 A1* | 9/2010 | Fornara | F02M 25/0836 123/520 |
| 2013/0263590 A1 | 10/2013 | Kempf et al. | |
| 2014/0005912 A1* | 1/2014 | Ide | F02D 41/1454 701/104 |
| 2015/0292421 A1* | 10/2015 | Pursifull | F02D 41/004 123/518 |
| 2016/0123280 A1* | 5/2016 | Makino | F02M 25/089 123/519 |
| 2016/0273494 A1 | 9/2016 | Hotta | |
| 2016/0305352 A1 | 10/2016 | Pursifull et al. | |

* cited by examiner

METHOD AND SYSTEM FOR CALCULATING FUEL INJECTION AMOUNT OF FUEL VAPOR DUAL PURGE SYSTEM

CROSS-REFERENCE TO RELATED APPLICATION

This application claims priority to and the benefit of Korean Patent Application No. 10-2018-0118783, filed on Oct. 5, 2018, which is incorporated herein by reference in its entirety.

FIELD

The present disclosure relates to a method and system for calculating a fuel injection amount of a fuel vapor dual purge system.

BACKGROUND

The statements in this section merely provide background information related to the present disclosure and may not constitute prior art.

Since environmental pollution is getting worse, regulations on exhaust gases which have a great influence on air pollution have been strengthened, and the automotive industry has actively sought to reduce pollutants in the exhaust gases. One method for reducing pollutants in the exhaust gases is by using a fuel evaporation gas recirculation apparatus in which a canister is applied to a fuel supply apparatus.

The canister contains an adsorbent material that can absorb a fuel evaporation gas from a fuel tank that stores the volatile fuel, and in order to inhibit a fuel evaporation gas that evaporates in the fuel tank from being discharged to the air, the canister is connected with the fuel tank to collect the fuel evaporation gas.

The fuel evaporation gas collected in the canister is again injected into the engine through a purge control solenoid valve (PCSV) that is controlled by an engine control unit (hereinafter referred to as an 'ECU') to be burned, and thus the fuel evaporation gas is recirculated.

The fuel evaporation gas collected in the canister is supplied to an intake manifold and ignited in the combustion chamber of the engine when a negative pressure is formed in the intake manifold. However, when a turbocharger operates, fuel vapor cannot be purged due to a positive pressure formed in the intake manifold. Therefore, the fuel vapor purge system in an engine having the turbocharger increases the purge flow rate by adding a second purge line branched from a main purge line and joined to an intake line of the front of a compressor.

When the turbocharger operates, the fuel vapor collected in the canister is discharged to the second purge line through a purge control solenoid valve due to negative pressure of the front end of the compressor of the turbocharger, and flows into the engine again through the compressor and intercooler. In this case, we have discovered that a purge path of the fuel vapor becomes very long, and a fuel vapor detection delay time of more than one cycle may occur. Here, the fuel vapor detection delay time means a time taken for the fuel vapor discharged to the second purge line through the solenoid valve to reach the surge tank.

Therefore, when the air/fuel ratio control is performed without considering the fuel vapor detection delay time, the total fuel amount in the combustion chamber may be irregular and its error is continuously occurred, resulting in inconsistency of the engine.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method and system for calculating a fuel injection amount of a fuel vapor dual purge system which may calculate volumetric efficiency, determine a fuel vapor detection delay time based on the volumetric efficiency, and calculate a fuel injection amount based on the fuel vapor detection delay time.

According to an exemplary form of the present disclosure, the method for calculating a fuel injection amount of a fuel vapor dual purge system for a vehicle having a combustion chamber and a turbocharger may include the steps of calculating, by a controller, volumetric efficiency of a combustion chamber, determining, by the controller, a fuel vapor detection delay time at which the fuel vapor is detected in a surge tank based on the calculated volumetric efficiency of the combustion chamber, calculating, by the controller, a time at which the fuel vapor is injected into the combustion chamber based on the determined fuel vapor detection delay time and calculating, by the controller, a fuel vapor total injection amount at the time at which the fuel vapor is injected into the combustion chamber.

The method for calculating the fuel injection amount of the fuel vapor dual purge system may be performed in a turbocharger operation section.

The method may include the step of calculating the time at which the fuel vapor is injected into the combustion chamber by summing a time at which the turbocharger operates and the fuel vapor detection delay time.

The method may further include the steps of calculating, by the controller, a total amount of fuel based on an amount of torque demanded by the driver, and calculating, by the controller, a fuel injection amount based on the total amount of fuel and the fuel vapor total injection amount.

The method may include the step of determining the fuel vapor detection delay time at which the fuel vapor is detected in a surge tank based on any one of a boost pressure, a surge tank pressure, an intake manifold pressure, and a torque amount.

According to another exemplary form of the present disclosure, a system for calculating a fuel injection amount of a fuel vapor dual purge system for a turbocharger in a vehicle includes the turbocharger including a compressor installed on an intake line to compress intake air, a canister collecting fuel vapor generated in a fuel tank, a purge control solenoid valve installed on a main purge line connected with the canister and configured to selectively block fuel vapor collected in the canister, a first purge line connecting the intake line at a downstream side of the compressor and the main purge line, a second purge line connecting the intake line at an upstream side of the compressor and the main purge line, a driving information sensing unit detecting driving information including a demanded torque, a demanded speed, an engine speed, and an engine load, an intake information sensing unit detecting intake information including atmospheric pressure, an intake temperature, an amount of intake air, and an intake manifold pressure, and a controller calculating volumetric efficiency of a combustion chamber based on the intake information, determining a fuel vapor detection delay time at which the fuel vapor is detected in a surge tank based on the calculated volumetric efficiency of the combustion chamber, calculating a time at which the fuel vapor is injected into the combustion chamber based on the determined the fuel vapor detection delay time, and calculating a fuel vapor total injection amount at the time at which the fuel vapor is injected into the combustion chamber.

The controller may determine whether it is a turbocharger operation section based on the driving information, and may calculate the fuel vapor total injection amount at the time at which the fuel vapor is injected into the combustion chamber if it is determined that it is the turbocharger operation section.

The controller may calculate the time at which the fuel vapor is injected into the combustion chamber by summing a time at which the turbocharger operates and the fuel vapor detection delay time.

The controller may calculate a total amount of fuel based on an amount of torque demanded by the driver based on the driving information, and calculate a fuel injection amount based on the total amount of fuel and the fuel vapor total injection amount.

The controller may determine the fuel vapor detection delay time at which the fuel vapor is detected in the surge tank based on any one of a boost pressure, a surge tank pressure, an intake manifold pressure, and a torque amount.

According to exemplary forms of the present disclosure, the fuel vapor detection delay time is detected in a conventional system without additional components such that a cost reduction is possible.

Since the fuel injection amount is calculated based on the fuel vapor detection delay time, the error of the amount of fuel injected into the combustion chamber of the engine can be reduced. Therefore, since the amount of fuel injected into the combustion chamber of the engine is reduced, it is possible to cope with exhaust gas and fuel economy regulations.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In specification and claims of the present disclosure, a fuel vapor detection delay time means a time taken for the fuel vapor discharged from a canister to a second purge line through an ejector to reach a surge tank of an engine.

In addition, turbocharger operation section means a driving section in which the turbocharger operates. Generally, a turbocharger operates in a high speed and high load driving section (i.e., vehicle speed is equal or higher than a predetermined speed and engine torque). A fuel vapor is purged into a second purge line in the turbocharger operation section.

Furthermore, volumetric efficiency means a ratio of an actual air amount introduced into a combustion chamber and a theoretical air amount which may be introduced into the combustion chamber.

Figure 1:
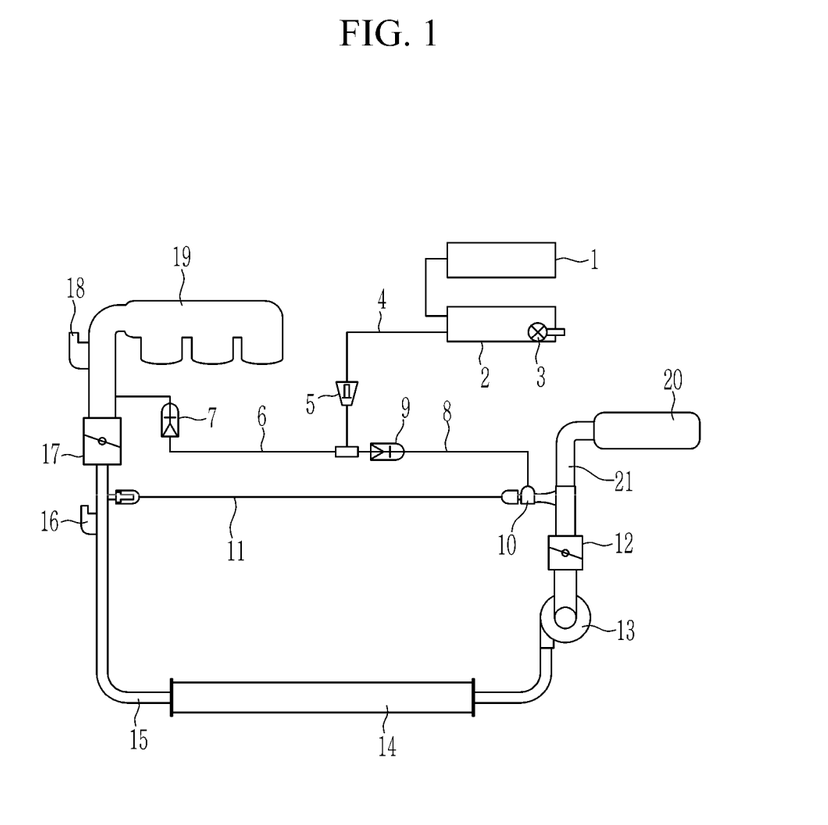
FIG. 1 is a schematic diagram illustrating a fuel vapor purge system according to an exemplary form of the present disclosure.

FIG. 1 is a schematic diagram illustrating a fuel vapor purge system according to an exemplary form of the present disclosure.

Referring to FIG. 1, intake air following into a vehicle is filtered for foreign materials while the intake air flows through an air cleaner 20, and is supplied to a compressor 13 through a first intake line 21. A differential pressure generation valve 12 is disposed at the first intake line 21, and amount of intake air supplied to the compressor 13 through the first intake line 21 is controlled according to an open and close amount of the differential pressure generation valve 12.

The intake air supplied to the compressor 13 reaches a surge tank 19 through a second intake line 15. An electronic throttle control valve 17 (electronic throttle valve control: ETC) is installed in the second intake line 15. The electronic throttle control valve 17 controls intake air supplied to a cylinder. The intake air reaching the surge tank 19 is supplied to a combustion chamber of a cylinder through an intake manifold.

A fuel vapor evaporated in a fuel tank 1 is collected in a canister 2 containing an adsorbent material. The canister 2 connects with the fuel tank 1, and a canister control valve 3 (canister control valve: CCV) is installed in the canister 2 to control the fuel vapor collected in the canister 2. The fuel vapor collected in the canister 2 is supplied to the combustion chamber through a main purge line 4 and burned. A purge control solenoid valve 5 (purge control solenoid valve; PCSV) is installed in the main purge line 4 to selectively block the fuel vapor collected in the canister 2. The purge control solenoid valve 5 is controlled by an ECU. When the coolant temperature and engine speed reach a certain level, the purge control solenoid valve 5 is opened to supply the fuel vapor to the combustion chamber.

The main purge line 4 is branched to a first purge line 6 and a second purge line 8.

The first purge line 6 is branched from the main purge line 4 to be joined to the second intake line 15 between the surge tank 19 and the electronic throttle control valve 17. Therefore, the fuel vapor collected in the canister 2 flows through the main purge line 4 and the first purge line 6, is supplied to the surge tank 19 through the second intake line 15, and then is burned in the combustion chamber. A first check valve 7 may be installed in the first purge line 6 to block the fuel vapor flowing back to the first purge line 6 from second intake line 15.

The second purge line 8 is branched from the main purge line 4 to be joined to the first intake line 21 between the air cleaner 20 and the differential pressure generation valve 12. A second check valve 9 may be installed in the second purge line 8 to block the fuel vapor flowing back to the second purge line 8 from the first intake line 21. An ejector 10 is installed at a point in which the second purge line 8 and the first intake line 21 join, and injects a fuel vapor supplied through the second purge line 8 to the first intake line 21. The fuel vapor injected to the first intake line 21 is supplied to the compressor 13 through the differential pressure generation valve 12. The compressor 13 compresses the intake air and the fuel vapor, and supplies them to the second intake line 15. The compressed intake air and the fuel vapor supplied through the second intake line 15 reach the surge tank 19, are supplied to the combustion chamber, and are burned.

An intercooler 14 for cooling the compressed intake air and the fuel vapor is installed in the second intake line 15.

A recirculation line 11 may be installed between the second intake line 15 of the rear end of the electronic throttle control valve 17 and the ejector 10 to recirculate part of the exhaust gas back to the engine.

A boost pressure sensor 16 may be installed between the intercooler 14 and the electronic throttle control valve 17 to detect a boost pressure of the intake air raised by the compressor 13.

An intake manifold pressure sensor 18 may be installed between the electronic throttle control valve 17 and the surge tank 19 to detect a pressure in the manifold.

Figure 2:
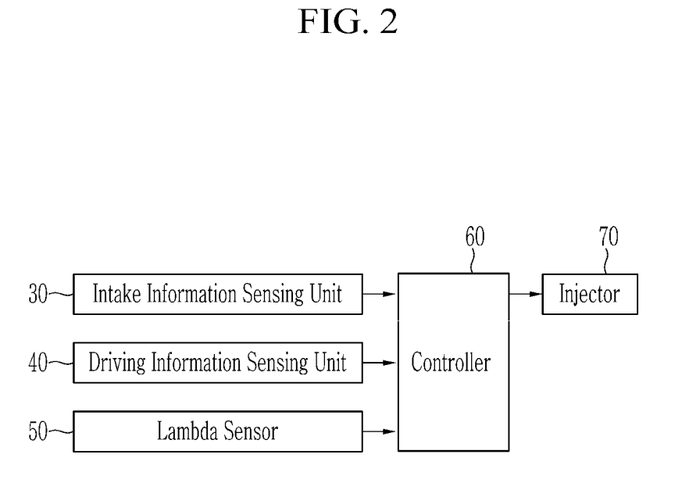
FIG. 2 is a block diagram illustrating relationship of inputs and outputs of a controller used in a method of calculating a fuel injection amount of fuel vapor based on a fuel vapor detection delay time according to an exemplary form of the present disclosure.

FIG. 2 is a block diagram illustrating relationships of inputs and outputs of a controller used in a method of calculating a fuel injection amount of fuel vapor based on a fuel vapor detection delay time according to an exemplary form of the present disclosure.

An intake information sensing unit 30 senses intake information including atmospheric pressure, intake temperature, an amount of intake air, and the intake manifold pressure, and transmits the intake information to a controller 60. The controller 60 calculates volumetric efficiency of a combustion chamber based on the intake information. Herein, the atmospheric pressure may be detected by an atmospheric sensor and the intake temperature may be detected by an intake temperature sensor. The amount of intake air may be detected by an intake flow meter and the intake manifold pressure may be detected by the intake manifold pressure sensor 18.

A driving information sensing unit 40 senses driving information including a demanded torque, a demanded speed, an engine speed, and an engine load, and transmits the driving information to the controller 60. Herein, the torque and speed demanded by a driver may be sensed by an acceleration pedal sensor equipped in the vehicle, the engine torque may be sensed by a torque sensor, and the engine speed is sensed by an engine speed sensor. The controller 60 determines whether it is a turbocharger operation section based on the driving information. In addition, the controller 60 calculates a total amount of fuel based on an amount of torque demanded by the driver based on the driving information.

A lambda sensor 50 senses a lambda coefficient of the exhaust gas exhausted from the combustion chamber, and feeds it back to the controller 60 to control the fuel injection amount. Herein the lambda coefficient is a ratio of the actual air-fuel ratio to a theoretical air-fuel ratio. If the lambda coefficient is larger than 1, it is in a lean state in which the air amount with respect to the amount of fuel is excessive. If the lambda coefficient is smaller than 1, it is in a rich state in which the fuel amount with respect to the amount of air is excessive. Therefore, the controller 60 can control the fuel injection amount to cause the lambda coefficient to reach a target lambda coefficient.

The controller 60 may be an engine control unit (ECU) equipped in the vehicle. The controller 60 may be calculate volumetric efficiency of a combustion chamber based on the intake information if it is determined to be in the turbocharger operation section based on the driving information. The controller 60 may be determine a fuel vapor detection delay time at which the fuel vapor is detected in a surge tank based on the calculated volumetric efficiency of a combustion chamber, calculate a time at which the fuel vapor is injected into the combustion chamber based on the determined fuel vapor detection delay time, calculate a fuel vapor total injection amount at the time at which the fuel vapor is injected into the combustion chamber by an injector 70, and control the fuel injection amount based on this.

The controller 60 may control the fuel injection amount injected by the injector 70 based on the lambda sensor 50 coefficient.

Accordingly, the controller 60 may be implemented by one or more processors which operate by a predetermined program, and the predetermined program may be programed to execute each step of the method for calculating the fuel injection amount of the fuel vapor dual purge system according to the exemplary form of the present disclosure.

Figure 3:
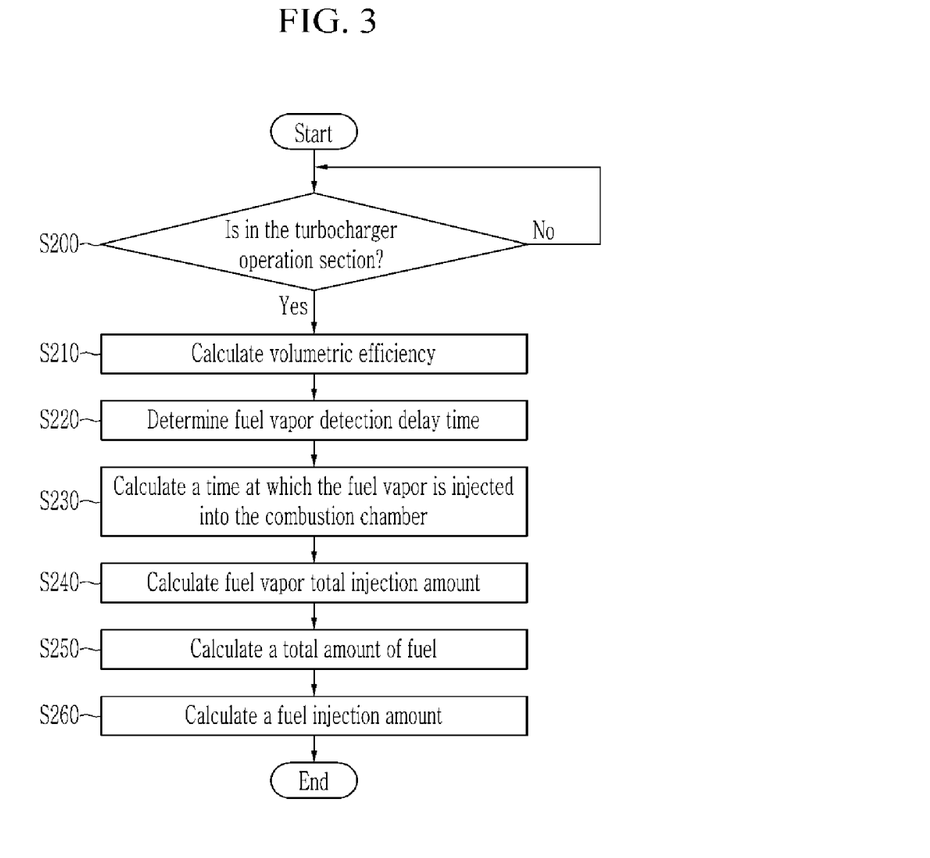
FIG. 3 is a flowchart of a method of calculating a fuel injection amount of fuel vapor based on a fuel vapor detection delay time according to an exemplary form of the present disclosure.

FIG. 3 is a flowchart of a method of calculating a fuel injection amount of fuel vapor based on a fuel vapor detection delay time according to an exemplary form of the present disclosure.

The controller 60 determines whether it is in a turbocharger operation section based on the driving information transmitted by the driving information sensing unit 40 (S200). For example, the turbocharger operation section may be a high speed and high load driving section. The controller 60 is not limited thereto, and may determine whether the present vehicle driving section is the turbocharger operation section according to a predetermined map based on the present engine speed and present engine torque.

In the turbocharger operation section, the boosting is realized by the compressor 13 of the turbocharger, and then the positive pressure is generated at the rear end of the electronic throttle control valve 17. Therefore, the fuel vapor collected in the canister 2 is discharged to the second purge line 8 through the purge control solenoid valve 5 and is injected to the front of the compressor 13 through the ejector 10.

The amount of the fuel vapor injected to the front of the compressor 13 through the ejector 10 may be previously stored in the controller 60 as map data depending on a difference of the pressure of the front and rear of the ejector 10. Therefore, the controller 60 may determine the amount of the fuel vapor injected to the front of the compressor 13 from the map data.

If it is determined to be in the turbocharger operation section in step S200, the controller 60 calculates the volumetric efficiency of the combustion chamber (S210). If it is not determined to be in the turbocharger operation section in step S200, the method returns to step S200.

Herein, the volumetric efficiency means a ratio of an actual air amount introduced into a combustion chamber and a theoretical air amount which may be introduced into the combustion chamber. The controller 60 may be calculated the volumetric efficiency based on the intake information including the atmospheric pressure, the intake temperature, an amount of intake air, and the intake manifold pressure sensed by the intake information sensing unit 30.

Figure 4:
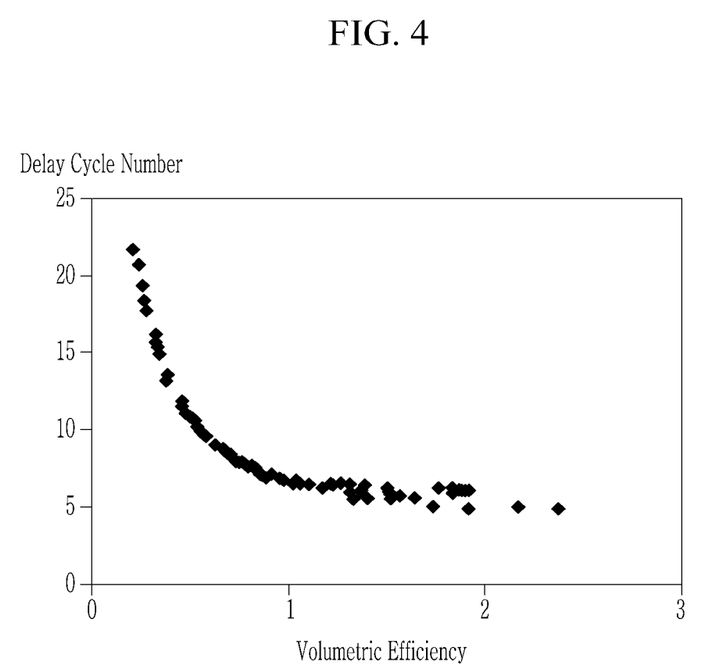
FIG. 4 is a graph illustrating a fuel vapor detection delay time with respect to volumetric efficiency according to an exemplary form of the present disclosure.
Figure 5:
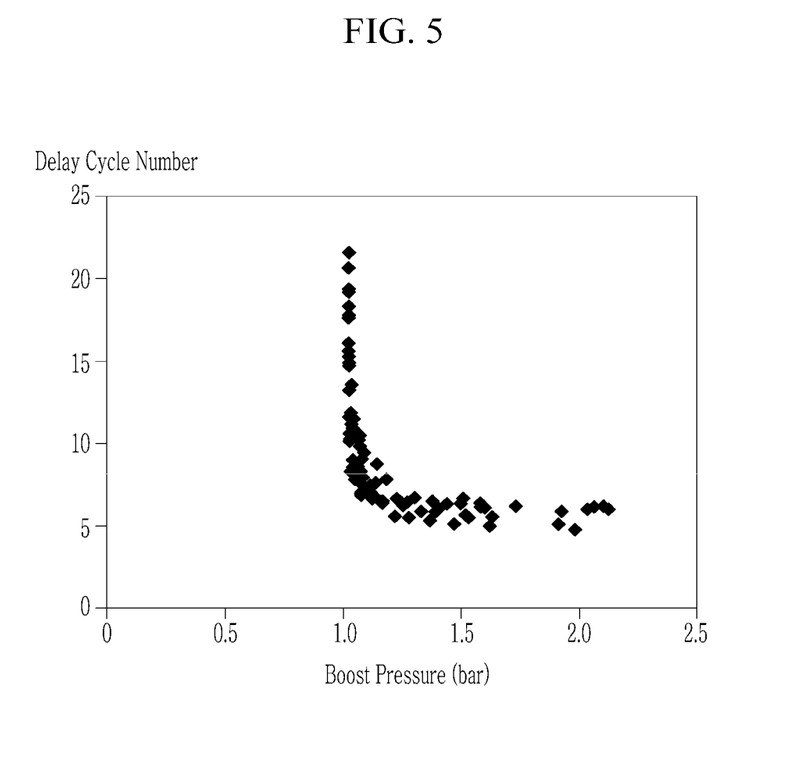
FIG. 5 is a graph illustrating a fuel vapor detection delay time with respect to boost pressure according to an exemplary form of the present disclosure.
Figure 6:
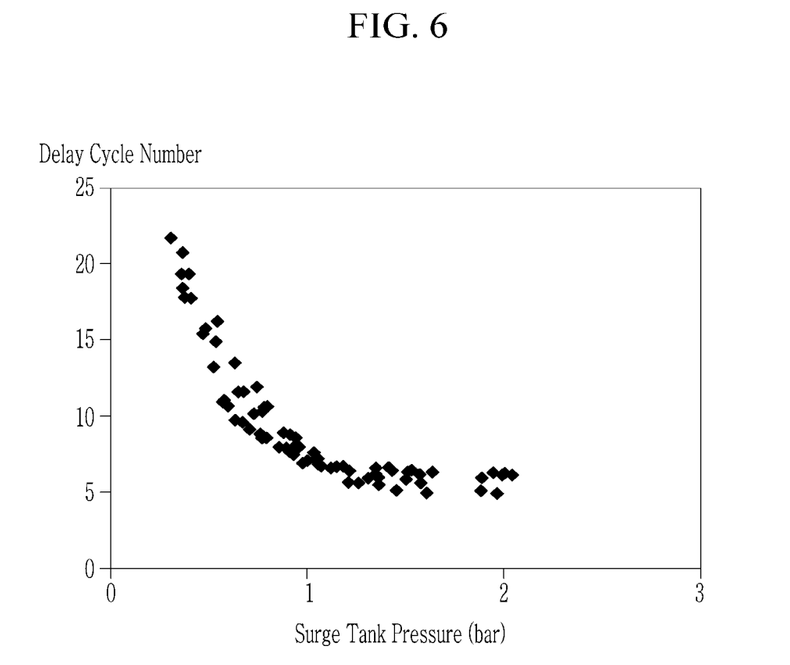
FIG. 6 is a graph illustrating a fuel vapor detection delay time with respect to surge tank pressure according to an exemplary form of the present disclosure.
Figure 7:
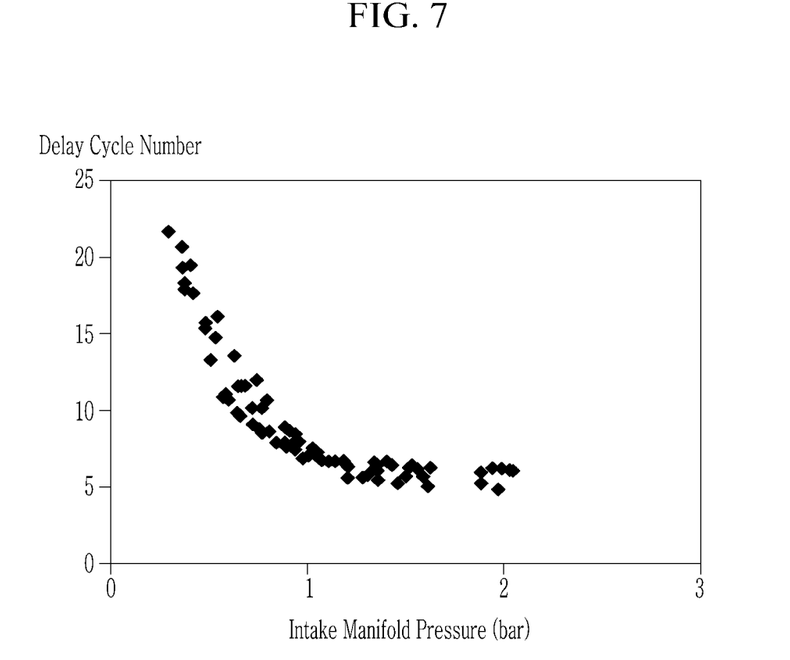
FIG. 7 is a graph illustrating a fuel vapor detection delay time with respect to intake manifold pressure according to an exemplary form of the present disclosure.
Figure 8:
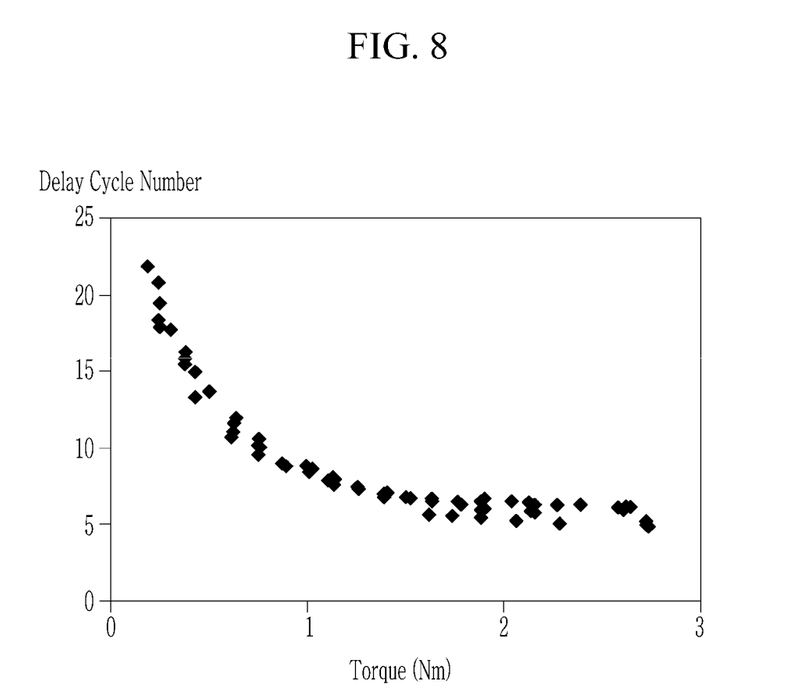
FIG. 8 is a graph illustrating a fuel vapor detection delay time with respect to a torque amount according to an exemplary form of the present disclosure.

Thereafter, the controller 60 determine a fuel vapor detection delay time at which the fuel vapor is detected in a surge tank based on the calculated volumetric efficiency of a combustion chamber (S220). As shown in FIG. 4, the controller 60 may previously store the fuel vapor detection delay time depending on the volumetric efficiency as map data, and the controller 60 may determine the fuel vapor detection delay time depending on the volumetric efficiency from the map data.

The controller 60 may previously store the fuel vapor detection delay time for the volumetric efficiency in a map data form for each engine because the fuel vapor detection delay time for the volumetric efficiency differs for each engine depending on flow characteristics.

Subsequently, the controller 60 calculates a time at which the fuel vapor is injected into the combustion chamber based on the fuel vapor detection delay time determined in step S220 (S230). The time at which the fuel vapor is injected into the combustion chamber may be calculated by summing a crank angle at the time when the turbocharger is operated and the purge control solenoid valve is operated, and the fuel vapor detection delay time determined in step S220.

Then, the controller 60 calculates a fuel vapor total injection amount at the time at which the fuel vapor is injected into the combustion chamber (S240).

The fuel vapor injected to the front of the compressor 13 is diffused after the delay time, and reaches the surge tank 19. A small amount of fuel vapor reaches the surge tank 19 at the initial stage of diffusion, a large amount of fuel vapor reaches the surge tank 19 at the middle stage of diffusion, and a small amount of fuel vapor reaches the surge tank 19 at the final stage of diffusion so that the graph of the amount of fuel vapor reaching the surge tank 19 over time has a bell-shaped form as a whole. Since the fuel vapor is continuously injected from the ejector 10 to the front of the compressor 13 when the turbocharger is operated in step S200 and the amount of the fuel vapor reaching the surge tank 19 has an overall bell-shaped form, the amount of fuel vapor reaching the surge tank 19 should be accumulated with respect to time. As described above, since the amount of fuel vapor injected to the front of the compressor 13 through the ejector 10 is previously stored to the controller 60 in the map data depending on a difference of the pressure of the front and rear of the ejector 10, the fuel vapor total injection amount at the time at which the fuel vapor is injected into the combustion chamber may be calculated according to the difference of the pressure of the front and rear of the ejector 10.

After that, the controller 60 calculates a total amount of fuel based on an amount of torque demanded by the driver at the time at which the fuel vapor is injected into the combustion chamber that is calculated in step S230 (S250). The amount of torque demanded by the driver may be determined based on the driving information sensed by the driving information sensing unit 40.

Then, the controller 60 calculates a fuel injection amount by subtracting the fuel vapor total injection amount calculated in step S240 from the total amount of fuel based on an amount of torque demanded by the driver in step S250 (S260).

FIG. 4 to FIG. 8 are graphs illustrating a fuel vapor detection delay time with respect to volumetric efficiency, boost pressure, surge tank pressure, intake manifold pressure, and torque amount, respectively, found through experiments.

Compared the graphs of FIG. 4 to FIG. 8, it can be seen that the fuel vapor detection delay time has the most significant relationship with volumetric efficiency. The fuel vapor detection delay time according to volumetric efficiency is stored as the map data type, and the fuel vapor detection delay time is determined from the volumetric efficiency.

Referring to FIGS. 4 to 8, it can be seen that the fuel vapor detection delay time for a driving point decreases as the volumetric efficiency, the boost pressure, the surge tank pressure, the intake manifold pressure, and the torque amount increase, respectively. The controller 60 previously stores the fuel vapor detection delay time according to volumetric efficiency, boost pressure, surge tank pressure, intake manifold pressure, and torque amount, respectively, as the map data type, and the fuel vapor detection delay time at which the fuel vapor is detected in a surge tank 19 can be determined based on any of these.

While this disclosure has been described in connection with what is presently considered to be practical exemplary forms, it is to be understood that the disclosure is not limited to the disclosed forms, but, on the contrary, it is intended to cover various modifications and equivalent arrangements included within the spirit and scope of the present disclosure.

DESCRIPTION OF SYMBOLS

1: fuel tank
2: canister
3: canister control valve
4: main purge line
5: purge control solenoid valve
6: first purge line
7: first check valve
8: second purge line
9: second check valve
10: ejector
11: recirculation line
12: differential pressure generation valve
13: compressor
14: intercooler
15: second intake line
16: boost pressure sensor
17: electronic throttle control valve
18: intake manifold pressure sensor
19: surge tank 20: air cleaner
21: first intake line
30: intake information sensing unit
40: driving information sensing unit
50: lambda sensor
60: controller
70: injector

What is claimed is:

1. A method for calculating a fuel injection amount of a fuel vapor dual purge system for a vehicle having a combustion chamber and a turbocharger, the method comprising the steps of:
   (a) calculating, by a controller, volumetric efficiency of the combustion chamber;
   (b) determining, by the controller, a fuel vapor detection delay time at which a fuel vapor is detected in a surge tank based on the calculated volumetric efficiency of the combustion chamber;
   (c) calculating, by the controller, a time at which the fuel vapor is injected into the combustion chamber based on the determined fuel vapor detection delay time; and
   (d) calculating, by the controller, a fuel vapor total injection amount at the time at which the fuel vapor is injected into the combustion chamber,
   wherein the steps (a) to (d) are performed in a turbocharger operation section.

2. The method of claim 1, wherein
   the time at which the fuel vapor is injected into the combustion chamber is calculated by summing a time at which the turbocharger operates and the fuel vapor detection delay time.

3. The method of claim 1, further comprising the steps of:
   calculating, by the controller, a total amount of fuel based on an amount of torque demanded by a driver; and
   calculating, by the controller, a fuel injection amount based on the total amount of fuel and the fuel vapor total injection amount.

4. The method of claim 1, wherein
   the fuel vapor detection delay time at which the fuel vapor is detected in the surge tank is determined based on any one of a boost pressure, a surge tank pressure, an intake manifold pressure, and a torque amount.

* * * * *